United States Patent [19]

Fu

[11] Patent Number: 5,255,755
[45] Date of Patent: Oct. 26, 1993

[54] POWER STEERING APPARATUS

[75] Inventor: Jian-Guo Fu, Yamatokooiryama, Japan

[73] Assignee: Koyo Seiko, Co., Ltd., Osaka, Japan

[21] Appl. No.: 860,412

[22] Filed: Mar. 30, 1992

[30] Foreign Application Priority Data

Apr. 2, 1991 [JP] Japan ................................. 3-98108

[51] Int. Cl.⁵ ............................................. B62D 5/04
[52] U.S. Cl. .................. 180/79.1; 318/371; 318/434
[58] Field of Search ............... 180/79.1; 318/371, 375, 318/434, 439

[56] References Cited

FOREIGN PATENT DOCUMENTS 0078394 11/1983 European Pat. Off. .
2608120 6/1988 France .
2613887 10/1988 France .
63262 4/1988 Japan .
41466 2/1989 Japan .
2135642 9/1984 United Kingdom .

OTHER PUBLICATIONS

Patent Abstracts of Japan, vol. 8, No. 247, Nov. 13, 1984.
Patent Abstracts of Japan, vol. 8, No. 264, Dec. 4, 1984.
Patent Abstracts of Japan, vol. 11, No. 27, Jan. 27, 1987.

Primary Examiner—David M. Mitchell
Assistant Examiner—Andrew C. Pike
Attorney, Agent, or Firm—Darby & Darby

[57] ABSTRACT

A power steering apparatus for eliminating the counter electromotive force generated upon stopping the motor for assisting steering force includes a circuit for opening all of the commutation-controlled switches (power transistors) each connected to an end of one of the coils of the motor and to disconnect and isolate the one ends from each other and prevent the production of a counter-electromotive force.

2 Claims, 6 Drawing Sheets

POWER STEERING APPARATUS

BACKGROUND OF THE INVENTION

1. Field of the Invention

This invention relates to a power steering apparatus in which the steering force of a steering wheel is assisted by a motor.

2. Description of the Related Art

FIG. 1 is a schematic sectional view illustrating a power steering apparatus which is disclosed in the Japanese patent application laid-open No. 64-41466. In the apparatus, an upper column shaft 2A to which a steering wheel 1 is attached is connected via a torsion bar 4 to a lower column shaft 2B which is coupled through a pinion 5a to a rack 5 of the steering gear. The upper column shaft 2A is rotatably supported by a column housing 3. A torque sensor 6 for detecting a torque applied to the upper column shaft 2A is disposed at the middle portion of the torsion bar 4. The output of the torque sensor 6 is led through a slip ring 11 which is provided in the column housing 3. A known direct drive motor DM of a three-phase motor is disposed at the upper portion of the lower column shaft 2B. The direct drive motor DM includes a rotor 7 fixed to the lower column shaft 2B, and a stator 8 enclosing the rotor 7 and having a coil 8a. The stator 8 is fixed to the inner wall of a motor case 9 which is attached to the lower end of the column housing 3.

FIG. 2 is a circuit diagram illustrating a conduction control circuit of the direct drive motor DM. A series circuit of power MOSFETs (hereinafter, referred to as "power transistors") T1 and T4 is connected between a DC power source +V and the ground E. To this series circuit, two series circuits respectively consisting of power transistors T2 and T5 and power transistors T3 and T6 are connected in parallel. The junction point A of the power transistors T1 and T4 is coupled to one end of the U-phase coil 8au of the coil 8a in the direct drive motor DM, the junction point B of the power transistors T2 and T5 to one end of the V-phase coil 8av, and the junction point C of the power transistors T3 and T6 to one end of the W-phase coil 8aw. The other ends of the coils 8au, 8av and 8aw are connected in common. A signal for commutation-controlling the power transistors T1-T6 is supplied from a control unit (not shown) to the gates G1-G6 of the power transistors T1-T6.

The operation of this power steering apparatus will be described.

When the steering wheel 1 is turned, a torque is applied to the upper column shaft 2A, and is detected by the torque sensor 6. A torque signal corresponding to the torque which is detected by the torque sensor 6 is inputted to the control unit (not shown). In accordance with this torque signal, the control unit supplies a signal, for commutation-controlling the power transistors T1-T6, to the gates G1-G6, thereby commutation-controlling the power transistors T1-T6. The currents flowing through the phase coils 8au, 8av, and 8aw are controlled by adjusting the conduction angles of the power transistors T1-T6, so as to control the rotating force of the direct drive motor DM. By changing the sequence of commutation-controlling the power transistors T1-T6, the direction of rotation of the direct drive motor DM is controlled. The rotation of the thus-driven direct drive motor DM causes the lower column shaft 2B to rotate, thereby assisting the steering force.

This assistance to the steering force decreases the torque applied to the upper column shaft 2A. When the torque signal ST from the torque sensor 6 is lowered to the dead zone, it becomes unnecessary to assist the steering force, and therefore the direct drive motor DM is stopped. In this case, even when the current supply to the phase coils 8au, 8av and 8aw is shut off, the rotor 7 still rotates owing to inertia. Therefore, the power transistors T1, T2, and T3 are turned off and the power transistors T4, T5, and T6 are turned on, so that the phase coils 8au, 8av and 8aw are short-circuited as shown in FIG. 3, and the rotor 7 is braked to immediately stop the rotation by the short circuit current.

After the phase coils are short-circuited, however, a counter electromotive force is generated in each of the phase coils 8au, 8av, and 8aw during a short period of time until the rotor stops, whereby a reversal rotating force acts on the rotor which stops, whereby a reversal rotating force acts on the rotor which applies an opposite rotating force to the steering wheel to that by the above-mentioned assisting force. This causes a feeling of physical disorder in the steerage and the return of the steering wheel to the straight cruising position is not well done.

SUMMARY OF THE INVENTION

The present invention has been developed in order to solve the above-mentioned problems. It is an object of the invention to provide a power steering apparatus in which a feeling of physical disorder is not produced in the steerage when the motor for assisting the steering force is stopped and the return of the steering wheel to the straight cruising position takes place.

The above and further objects and features of the invention will more fully be apparent from the following detailed description with accompanying drawings.

DESCRIPTION OF THE PREFERRED EMBODIMENTS

Figure 4:
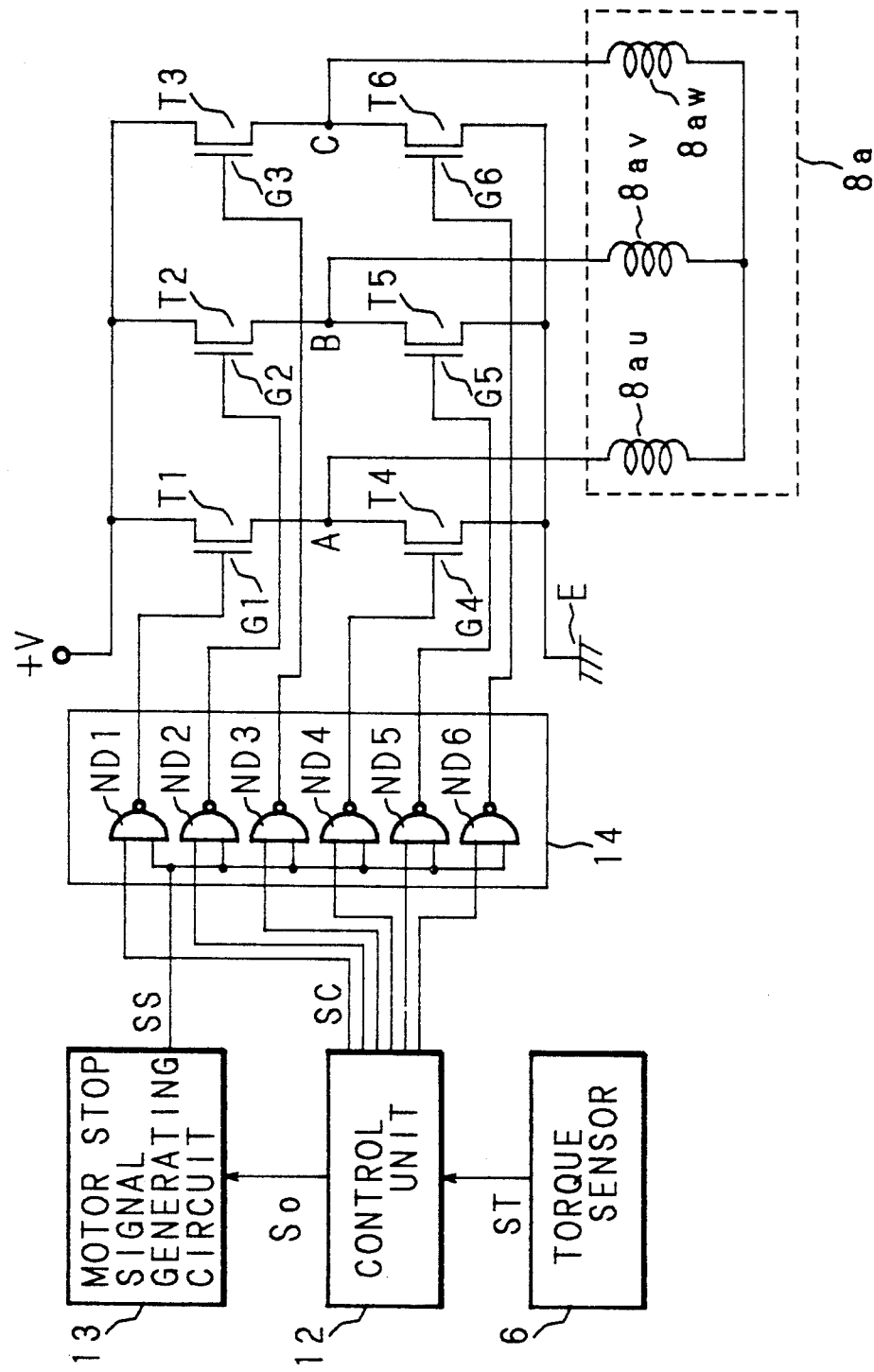
FIG. 4 is a circuit diagram illustrating a conduction control circuit for a motor used in a power steering apparatus according to the invention.

The invention will be described with reference to the accompanying drawings illustrating an embodiment. FIG. 4 is a circuit diagram illustrating a conduction control circuit of a direct drive motor used in a power steering apparatus according to the invention. In the circuit, a torque signal ST outputted from a torque sensor 6 is inputted to a control unit 12 which includes a microcomputer and its associated elements. A dead zone reaching signal So outputted from the control unit 12 is inputted to a motor stop signal generating circuit 13. A stop signal SS which is an output signal of the circuit 13 is supplied to one input terminal of each of NAND circuits ND1-ND6 in a pulse width modulation (PWM) unit 14. A control signal SC from the control unit 12 is supplied to the other input terminal of each of the NAND circuits ND1-ND6.

The outputs of the NAND circuits ND1, ND2, and ND3 are respectively coupled to the gates G1, G2, and G3 of power transistors T1, T2, and T3. The outputs of the NAND circuits ND4, ND5, and ND6 are respectively coupled to the gates G4, G5, and G6 of power transistors T4, T5, and T6. A series circuit of the power transistors T1 and T4 is connected between a DC power source +V and the ground E. To this series circuit, two series circuits respectively of power transistors T2 and T5 and power transistors T3 and T6 are connected in parallel. The junction point A of the power transistors T1 and T4 is coupled to one end of the U-phase coil 8au of the coil assembly 8a in a direct drive motor, the junction point B of the power transistors T2 and T5 to one end of the V-phase coil 8av, and the junction point C of the power transistors T3 and T6 to one end of the W-phase coil 8aw. The other ends of the coils 8au, 8av and 8aw are connected in common.

Figure 5:
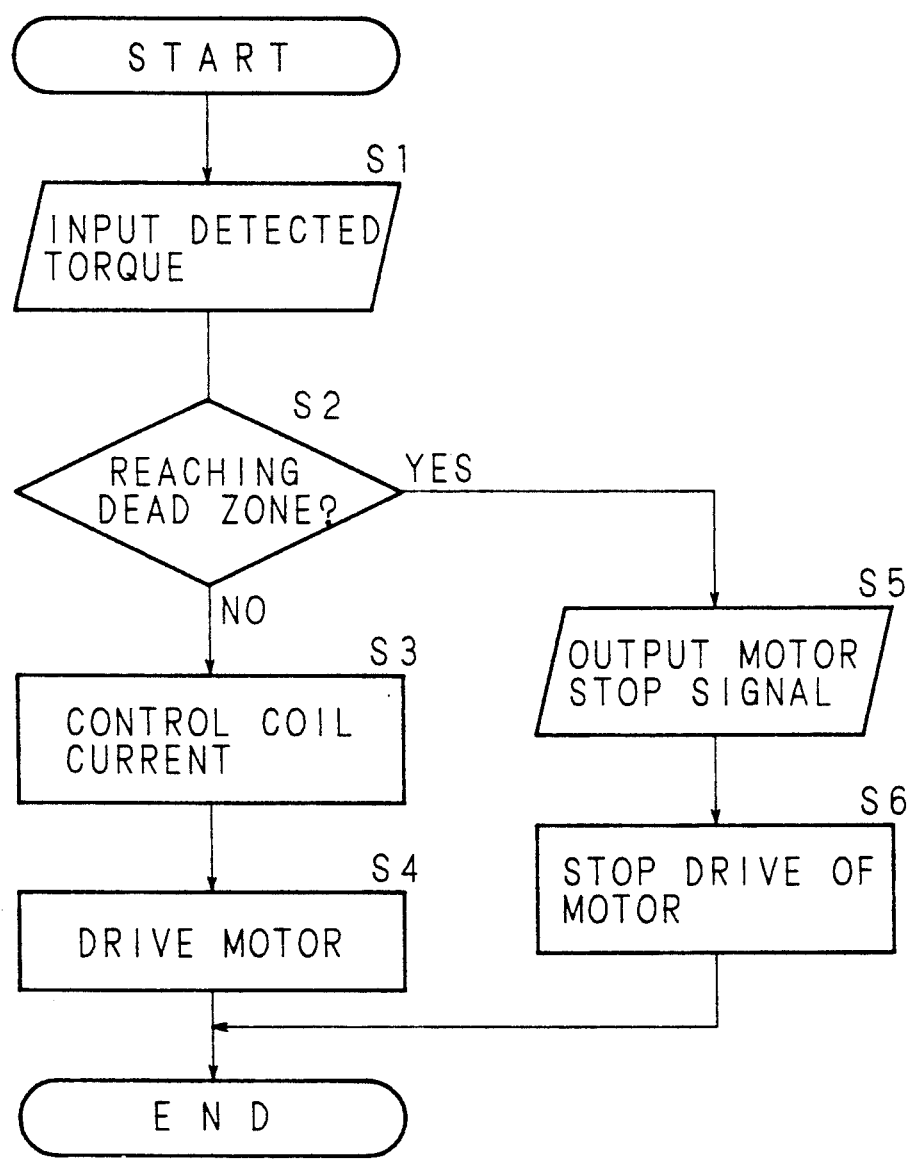
FIG. 5 is a flowchart showing the control sequence of a control unit according to the invention.
Figure 6:
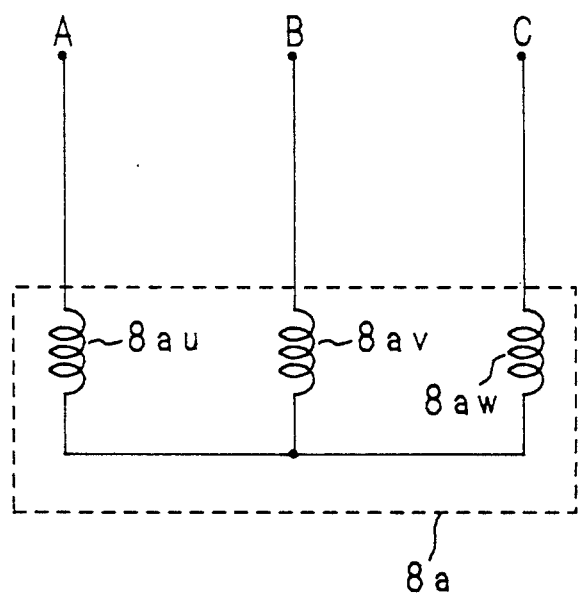
FIG. 6 is a diagram illustrating the manner of disconnecting coils when the motor in the power steering apparatus according to the invention is stopped.

The operation of the thus configured power steering apparatus will be described with reference to the flowchart of FIG. 5 which shows the control sequence of the control unit 12 and also to FIG. 6 which illustrates the manner of disconnecting the coils when the driving motor is stopped.

The torque sensor 6 detects a torque which is generated in response to the operation of a steering wheel, and a torque signal ST corresponding to the torque detected by the torque sensor 6 is inputted to the control unit 12 (S1). The control unit 12 judges whether the inputted torque signal ST reaches a predetermined dead zone (S2). When the inputted torque signal ST does not reach the dead zone, the control unit 12 outputs a control signal SC for commutation-controlling the power transistors T1-T6 to the NAND circuits ND1-ND6 in the PWM output unit 14.

Figure 1:
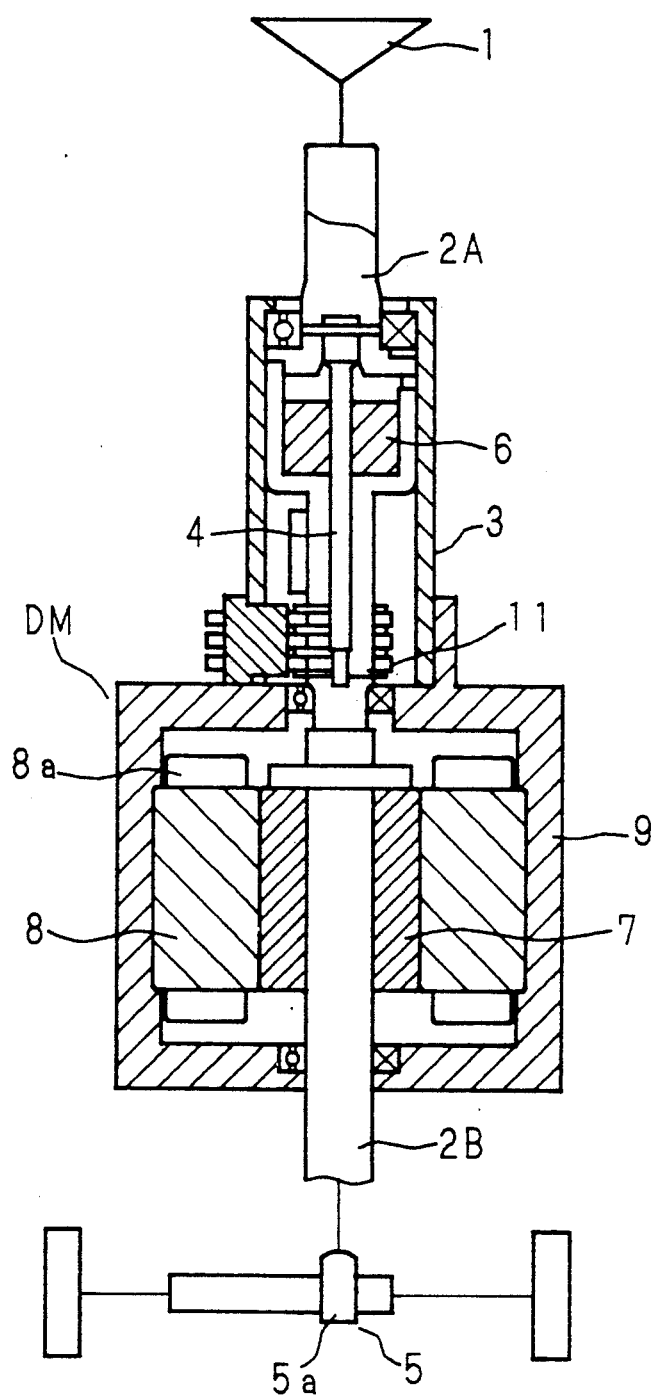
FIG. 1 is a schematic sectional view illustrating the configuration of a conventional prior art power steering apparatus.
Figure 2:
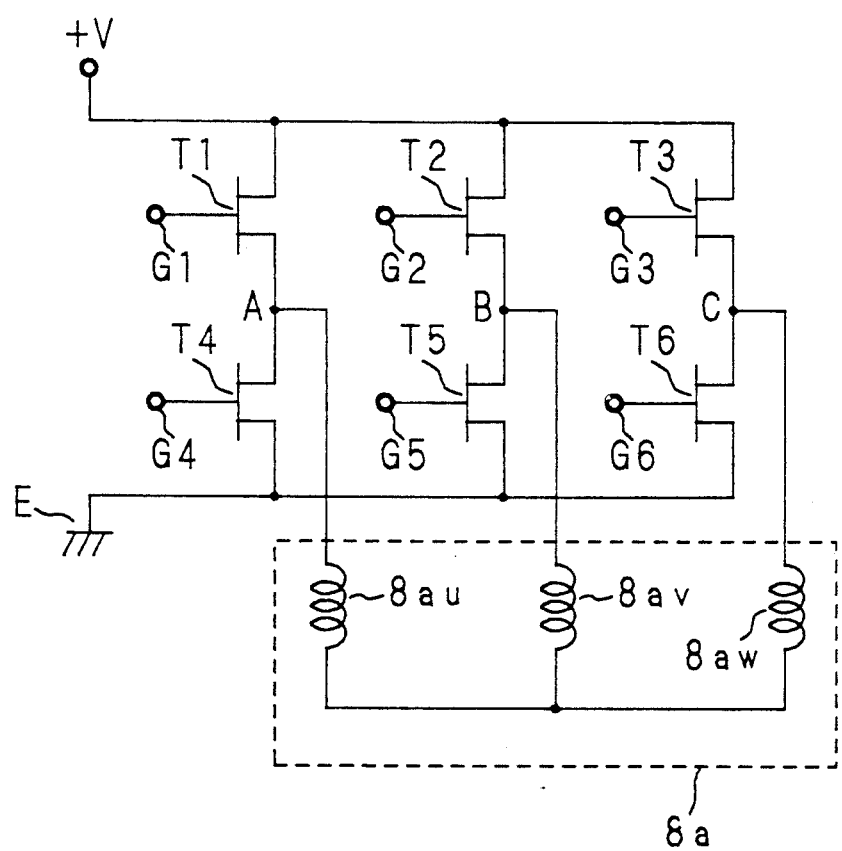
FIG. 2 is a circuit diagram illustrating a conduction control circuit for the motor in a conventional power steering apparatus.
Figure 3:
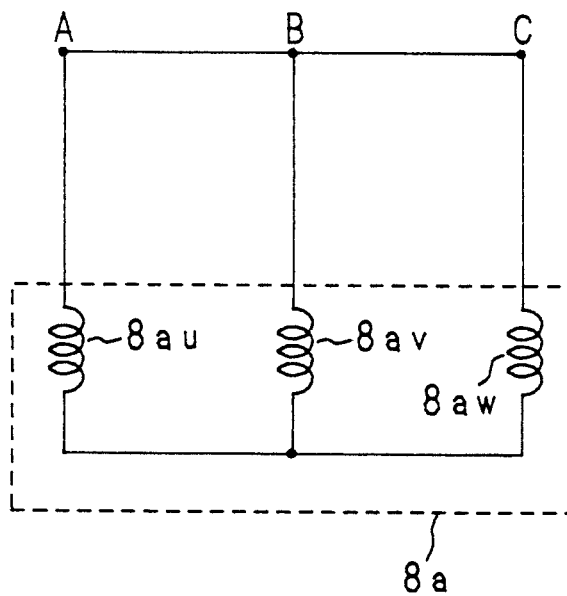
FIG. 3 is a diagram illustrating the conventional manner of disconnecting coils when the motor is stopped.

The outputted signals from the NAND circuits ND1-ND6 are inputted to the gates G1-G6 of the power transistors T1-T6 to commutation-control the power transistors T1-T6. The currents flowing through the phase coils 8au, 8av, and 8aw are controlled by adjusting the conduction angles of the power transistors T1-T6, so that the rotating force of the direct drive motor is controlled (S3). By changing the sequence of commutation-controlling the power transistors T1-T6, the direction of rotation of the direct drive motor is controlled. Thus, the rotation of the direct drive motor is controlled in accordance with the torque detected by the torque sensor 6 (S4). With the rotation of the direct drive motor, the lower column shaft 2B (see FIG. 1) also rotates to assist the steering force.

This assistance of the steering force by the rotation of the motor decreases the torque, thereby to lower the torque detected by the torque sensor 6. The control unit 12 judges whether the torque signal ST reaches the dead zone, i.e., whether the magnitude of the torque is the level at which it is unnecessary to assist the steering force (S2). When the torque signal ST is within the dead zone, the dead zone reaching signal So is inputted to the motor stop signal generating circuit 13.

Upon receiving the dead zone reaching signal So, the motor stop signal generating circuit 13 outputs the stop signal SS to the NAND circuits ND1-ND6 (S5). When the NAND circuits ND1-ND6 to which the control signal SC is inputted receive simultaneously the stop signal SS, the outputs of the NAND circuits ND1-ND6 are simultaneously inverted, whereby the power transistors T1-T6 are simultaneously turned off.

In this way, the coils 8au, 8av and 8aw respectively provided for U-, V- and W-phases are disconnected from the DC power source +V and the ground E, with the result that the motor is stopped (S6). The junction points A, B, and C, i.e., the corresponding ends of the U-phase coil 8au, V-phase coil 8av and W-phase coil 8aw are isolated from each other as shown in FIG. 6. When the motor is stopped, therefore, a counter electromotive force is not generated in the coils 8au, 8av, and 8aw for U-, V-, and W-phases during the period of time until the motor stops rotating. Consequently, no reverse rotating force owing to a counter electromotive force acts on the motor. Accordingly, a feeling of physical disorder is not produced in the steerage, and the return of the steering wheel to the straight cruising position is properly made.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

What is claimed is:

1. A power steering apparatus comprising:
a sensor for detecting torque generated by rotating a steering wheel;
a motor for assisting steering force which has plural coils, one end of each coil being connected to a respective switch and another end of each of the coils connected in common, said motor being rotated by a current selectively supplied to said plural coils by opening and closing of said switches; and
control means for driving said motor by commutation-controlling said switches in accordance with said detected torque, and for opening all of said switches to disconnect said one ends from each other upon stopping drive of said motor.

2. A power steering apparatus according to claim 1, wherein said control means comprises a control unit for outputting a commutation-control signal for said switches in accordance with said detected torque and generating a stop signal for stopping the drive of said motor, and a gate circuit supplied with said commutation-control signal as one input and said stop signal as another input for controlling the opening and closing of said switches.

* * * * *